United States Patent
Fotland et al.

(10) Patent No.: US 10,359,527 B2
(45) Date of Patent: Jul. 23, 2019

(54) SEDIMENTARY CHARACTERIZATION FROM SEISMIC DATA

(71) Applicant: SCHLUMBERGER TECHNOLOGY CORPORATION, Sugar Land, TX (US)

(72) Inventors: Bjørn Harald Fotland, Stavanger (NO); Lars Sønneland, Tananger (NO); Pierre Le Guern, Tananger (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 275 days.

(21) Appl. No.: 15/375,891

(22) Filed: Dec. 12, 2016

(65) Prior Publication Data

US 2017/0167254 A1   Jun. 15, 2017

Related U.S. Application Data

(60) Provisional application No. 62/266,095, filed on Dec. 11, 2015.

(51) Int. Cl.
*G01V 1/30* (2006.01)
*G01V 1/28* (2006.01)
*G01V 99/00* (2009.01)

(52) U.S. Cl.
CPC .............. *G01V 1/306* (2013.01); *G01V 1/282* (2013.01); *G01V 1/302* (2013.01); *G01V 99/005* (2013.01); *G01V 2210/614* (2013.01); *G01V 2210/6169* (2013.01); *G01V 2210/624* (2013.01); *G01V 2210/64* (2013.01); *G01V 2210/661* (2013.01)

(58) Field of Classification Search
CPC ........ G01V 1/302; G01V 1/282; G01V 1/306; G01V 99/005; G01V 2210/624; G01V 2210/64; G01V 2210/661; G01V 2210/614; G01V 2210/6169
USPC .................................................. 703/10; 702/6
See application file for complete search history.

(56) References Cited

U.S. PATENT DOCUMENTS

| | | |
|---|---|---|
| 2004/0260476 A1 | 12/2004 | Borgos et al. |
| 2008/0014319 A1 | 1/2008 | Dough |
| 2011/0077918 A1* | 3/2011 | Mutlu ...................... G01V 9/00 703/2 |
| 2011/0315376 A1 | 12/2011 | Sun et al. |

(Continued)

FOREIGN PATENT DOCUMENTS

WO       2013092663 A2    6/2013

OTHER PUBLICATIONS

Waltham et al, "Stratigraphic modelling of turbidite prospects to reduce exploration risk" Petroleum Geoscience, vol. 14 2008, pp. 273-280 (Year: 2008).*

*Primary Examiner* — Eunhee Kim

(57) ABSTRACT

A computer-based method of optimizing a sedimentary flow simulation is provided. The method includes: providing seismic data for a geological volume, the seismic data comprising one or more sedimentary layers; de-compacting the sedimentary layers to obtain a sedimentary volume; providing a sedimentary flow simulation to model the deposition of the sedimentary volume, the simulation including a plurality of sedimentation process parameters; and optimizing the process parameters to match the modelled sedimentary volume to the sedimentary layers of the seismic data.

20 Claims, 5 Drawing Sheets

(56) References Cited

U.S. PATENT DOCUMENTS

2012/0143575 A1 6/2012 Imhof et al.
2013/0218538 A1* 8/2013 Fuecker .............. G06F 17/5018
　　　　　　　　　　　　　　　　　　　　703/2

* cited by examiner

SEDIMENTARY CHARACTERIZATION FROM SEISMIC DATA

CROSS-REFERENCE TO RELATED APPLICATIONS

This application claims the benefit of U.S. Provisional Application Ser. No. 62/266,095, filed Dec. 11, 2015 and titled SEDIMENTARY CHARACTERIZATION FROM SEISMIC DATA, the entire disclosure of which is herein incorporated by reference.

BACKGROUND OF THE DISCLOSURE

This section is intended to introduce the reader to various aspects of art that may be related to various aspects of the presently described embodiments. This discussion is believed to be helpful in providing the reader with background information to facilitate a better understanding of the various aspects of the described embodiments. Accordingly, it should be understood that these statements are to be read in this light and not as admissions of prior art.

Stratigraphy is fundamental to the discipline of geology in describing the spatial, geometrical, structural, sequential and temporal relationships of rock units. In response to the formation of rocks in highly variable depositional environments and with varying sedimentary compositions, stratigraphic approaches span a wide range of disciplines, such as, litho-, bio-, chrono-, magneto-, seismic-, sequence- and chemo-stratigraphy.

Generally, in early stage geological exploration, little or no information is available on sediment characteristics. The identification and analysis of a potential hydrocarbon reservoir is a matter of interpretation and analysis of seismic reflection data.

Seismic surveying is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of such strata.

Seismic images indirectly depict the distribution of material deposited over large areas. Exploiting the fact that different seismic signatures characterize different depositional settings, seismic sequence stratigraphy can be used to infer depositional settings and their spatial and temporal distribution.

Deciphering geological history in this way enables analysis and estimation of probable sedimentary characteristics. However, performing sequence stratigraphic analysis over large seismic volumes is a daunting task, particularly if done manually. Hence, there is a need for automated analysis tools.

United States Patent Publication No. 2004/0260476 (hereby incorporated by reference for all purposes) discloses a method for automated extraction of surface primitives from seismic data.

For example, one embodiment of the method of United States Patent Publication No. 2004/0260476 involves defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume.

Subsurface stratification results from the nature of deposition—newer sediments being deposited on top of older sediments. The spatial (and temporal) variability of stacking patterns, or sequences, observed in seismic images relates to depositional environments and post-depositional processes, such as erosion and tectonic activity.

Linking reflection patterns to depositional environments, and vertical stacking order to order of deposition and, thus, relative timing, enables the geological history of the subsurface to be deciphered.

United States Patent Publication No. 2008/014319 (hereby incorporated by reference for all purposes) proposes a method of processing stratigraphic data in which appropriate sampling of horizon surfaces within a geological volume allows the horizon surfaces to be assigned respective relative geological ages in a methodical and self-consistent manner, such that conflicts between the relative geological ages of different horizon surfaces can be avoided.

Because stacking order relates to relative time of deposition, it can be possible to show graphically the depositional history of observed seismic data. For example, flattening the sedimentary layers and plotting them according to their time of deposition provides a useful mapping known as a chronostratigraphic chart. This is a graphic display, with geologic age along the vertical axis and distance along the horizontal axis, providing a visualization of the relative ages and geographic extent of sediments over a given area. The time of deposition of each sediment is generally relative, unless extra information e.g. from well logs is available whereby exact dating may be performed.

Sedimentation flow simulation is a tool for modelling sedimentation processes that lead to the formation of sedimentary layers in geological volumes. It is particularly useful in the context of hydrocarbon exploration for the construction of basin models that can be used to predict the location and/or characteristics of hydrocarbon reservoirs and the characteristics of surrounding formations.

Sedimentation processes can be complex and influenced by multiple factors, such as input bathymetry, sediment supply rate etc. Thus it can be helpful to constrain or calibrate sedimentation flow simulations by reference to external measurements. In particular, it is desirable that sedimentation flow simulations are consistent with seismic data for the relevant geological volume. Conversely, interpretation of seismic data can be assisted by improved sedimentation flow simulations.

SUMMARY

Embodiments of the present disclosure relate to using seismic data to characterize sediment/sedimentation and/or optimize sedimentary flow simulation.

In a first aspect, some embodiments of the present disclosure use seismic data to optimize a sedimentary flow simulation. In such embodiments, seismic data for a geological volume comprising one or more sedimentary layers is analyzed by de-compacting the sedimentary layers to obtain a sedimentary volume. A sedimentary flow simulation is used to model the deposition of the sedimentary volume, where the simulation may include a plurality of sedimentation process parameters associated with the simulation of the sedimentary flow. In embodiments, the process parameters are optimized to match the modelled sedimentary volume to the sedimentary layers of the seismic data. The sedimentary flow simulation may be processed with the optimized process parameters to develop an image/understanding of a subterranean structure encompassing/including the sedimentary volume and/or properties of the sediment and/or rock/formation in the sedimentary volume.

By requiring the simulation to model a sedimentary volume determined from the seismic data, the simulation can be optimized efficiently and consistency with the seismic data can be improved.

In some embodiments of the present disclosure, the optimized sedimentary flow simulation may be used to model the deposition of the one or more sedimentary layers in the geological volume to determine properties/an image of the one or more sedimentary layers in the geological volume In some embodiments of the present disclosure, a well drilling operation may be controlled by using the analysis of the geological volume to determine a well trajectory extending through the geological volume, and drilling a well having the specified trajectory. For example, properties of the sediment/rock in one or more of the volumes may be determined and a drilling trajectory based on the properties may be selected. In some embodiments, measurements made while drilling may be used to update the sedimentary flow simulation/process parameters and new properties of the sediment/rock determined/updated, and the new properties may be used to control the drilling operation and/or adjust the trajectory.

Further aspects of the present disclosure may provide: a computer program comprising code which, when run on a computer, causes the computer to perform the method of the first or second aspect; a computer readable medium storing a computer program comprising code which, when run on a computer, causes the computer to perform the method of the first or second aspect; and/or a computer system programmed to perform the method of the first or second aspect. For example, in various embodiments of the present disclosure, a computer system provided for optimizing a sedimentary flow simulation may include: a computer-readable medium or media storing (i) seismic data for a geological volume, the seismic data comprising one or more sedimentary layers and (ii) a sedimentary flow simulation to model the deposition of a sedimentary volume, the simulation including a plurality of sedimentation process parameters; and one or more processors configured to (i) de-compact the sedimentary layers to obtain the sedimentary volume and (ii) optimize the process parameters to match the modelled sedimentary volume to the sedimentary layers of the seismic data. The system thus corresponds to the method of the first aspect. The one or more processors may further be configured to (iii) use the optimized sedimentary flow simulation to model the deposition of the one or more sedimentary layers in the geological volume. The system may further include a display device for displaying the modelled sedimentary layers and/or the seismic data.

In embodiments, the sedimentary flow simulation may model sedimentation by different sediment particle sizes, the optimized process parameters including process parameters which specify (i) the distribution of particle sizes in the flowing sediment and (ii) variations in flow behavior for different sediment particle sizes.

The sedimentary flow simulation may include a constraint specifying a paleo sea floor for the deposition of the sedimentary volume. The paleo sea floor may be palinspastically reconstructed from a present-day topography, e.g. a topography corresponding to a surface primitive from the seismic data.

The sedimentary flow simulation may include a constraint specifying sea level variation with geological time. The optimization can then match onlaps and/or downlaps in the sedimentary layers to the sea level variation.

The sedimentary flow simulation may include a constraint which specifies one or more sources of sediment particles and fluid.

The sedimentary flow simulation may model turbidity currents.

The sedimentary flow simulation may further generate synthetic seismic data from the modelled sedimentary volume. The optimization can then match the modelled sedimentary volume to the sedimentary layers of the (real) seismic data by comparing the real seismic data with the synthetic seismic data. For example, the comparison can be between the real and the synthetic thickness of the sedimentary layers at different positions in the geological volume, and/or between real and synthetic seismic reflector characteristics.

The seismic data may be provided by: providing raw seismic test data for the geological volume (e.g. by performing seismic testing on the geological volume), and extracting extrema positions within the raw data to generate the seismic data. The seismic data may include surface primitives generated from the extracted extrema positions, the surface primitives sparsely populating the geological volume. The surface primitives may be sorted according to their geological time of deposition.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Embodiments of the present disclosure will now be described by way of example with reference to the accompanying drawings in which.

Figure 1:
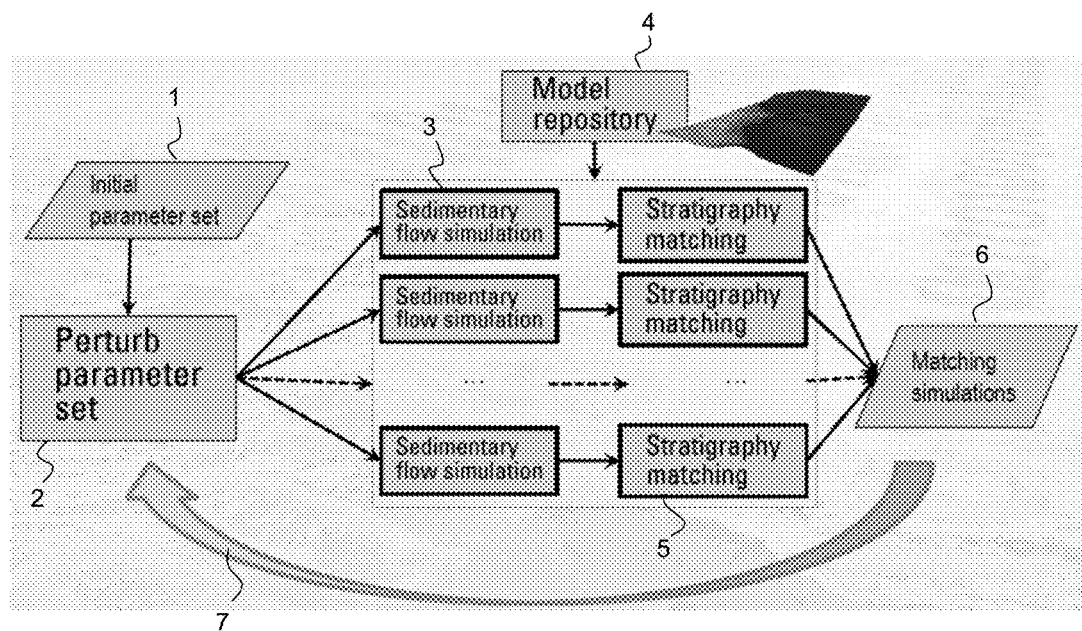
FIG. 1 shows a flow chart of stages in a computer-based method of optimizing a sedimentary flow simulation.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only, and is not intended to limit the scope, applicability or configuration of the present disclosure. Rather, it should be understood that various changes may be made in the function and arrangement of elements without departing from the scope of the present disclosure.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Also, it is noted that embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 shows a flow chart of stages in a computer-based method of optimizing a sedimentary flow simulation. The sedimentary flow simulation models the deposition of a sedimentary volume, and includes a plurality of sedimentation process parameters. Values for these parameters are held as an initial parameter set 1. The set is then perturbed 2. This can be achieved by setting ranges for the parameters that are to be varied, and selecting different combinations of possible values for the varied parameters. Each combination is used by the sedimentary flow simulation to make a respective prediction 3 for the sedimentary volume. To increase the speed of the optimization these predictions can be performed in parallel, as illustrated in FIG. 1.

Next, seismic data for the geological volume is obtained from a model repository 4. This data comprises one or more sedimentary layers that are previously de-compacted to provide the sedimentary volume to be modelled by the simulation. The seismic data are matched 5 to the respective predictions of the sedimentary flow simulation. A matching metric measures how well a given prediction fits the seismic data. It can also take account of goodness-of-fit of the prediction to other data, if available, such as well logging data or seismic inversion data. For example, if there is a well log in the area which has information about grain sizes, the metric can measure the difference between well log and predicted grain sizes.

The predictions of the simulations are ranked 6 according to their matching metrics, and the parameter values of the best predictions (for example, the best 10%) are used to adjust 7 the ranges for the parameters that are to be varied. The perturbing 2, predicting 3, and matching 5 stages are then repeated, and a new set of rankings obtained. This loop can be further repeated, as necessary, until the variable parameters are optimized.

The sedimentary flow simulation can simulate processes such as, for non-limiting example, diffusion (including erosion and sediment transportation), turbidity currents (including river-induced sediment movement and undersea avalanches), deltas and/or tectonics.

The simulation typically requires as inputs: the paleo sea floor, a function describing the sea-level curve, and one or more sediment sources which are locations where a mixture of sediments and fluid is introduced into the simulation at rates determined by fluid and sediment functions.

The paleo floor can be derived from seismic data. However, if the area of interest has been subjected to tectonic activity, the present-day floor topography may have been faulted, uplifted/subsided and/or tilted. Thus present-day topography can be restored to its geometry at deposition. Such restoration is termed palinspastic reconstruction, and can be performed using inversion methods familiar to the skilled person that unfault, shift or untilt the geometry based on the positions of horizons and faults in a structural model. For example, software Dynel2D/3D™ and Poly3D™ to perform palinspastic reconstruction is commercially available from IGEOSS™.

The sedimentary volume acts a constraint on the simulation. Other constraints can be the positions of downlap and coastal onlap terminations. The constraints may be used to determine physical volumes of sediment, locations where aggregation of sediment of similar properties is expected, volumes of sediments that were created/deposited at the same geological age and/or the like. As such, the constraints may be used in the sedimentary flow simulation to understand the sedimentation process in the basin of interest.

Figure 2:
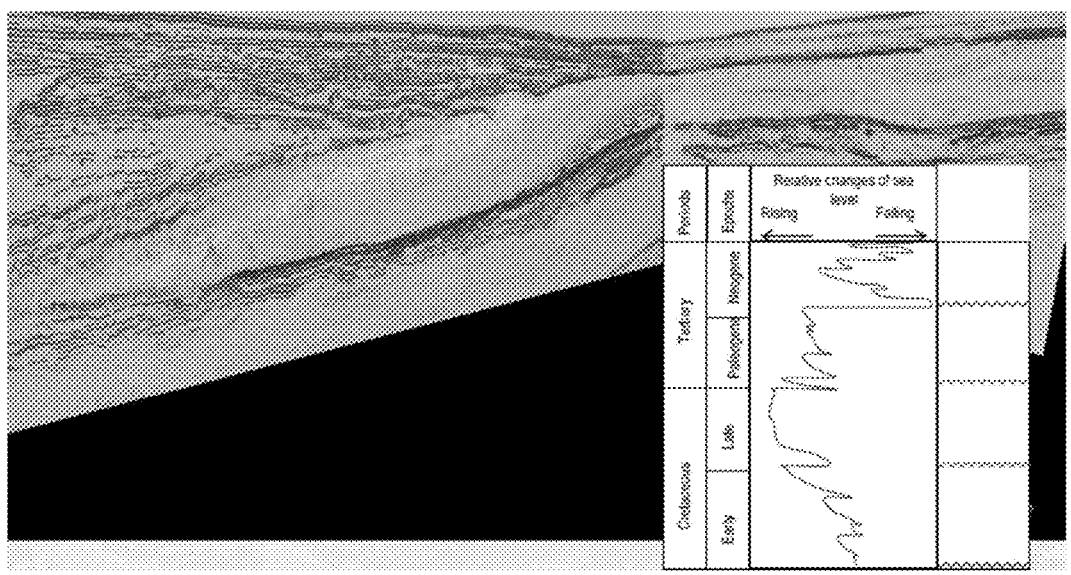
FIG. 2 shows schematically sections though an extrema representation of seismic data for a geological volume, including surface primitives formed by extracting extrema positions within the extrema representation, and further shows schematically at bottom right a global, published, sea-level curve.
Figure 3:
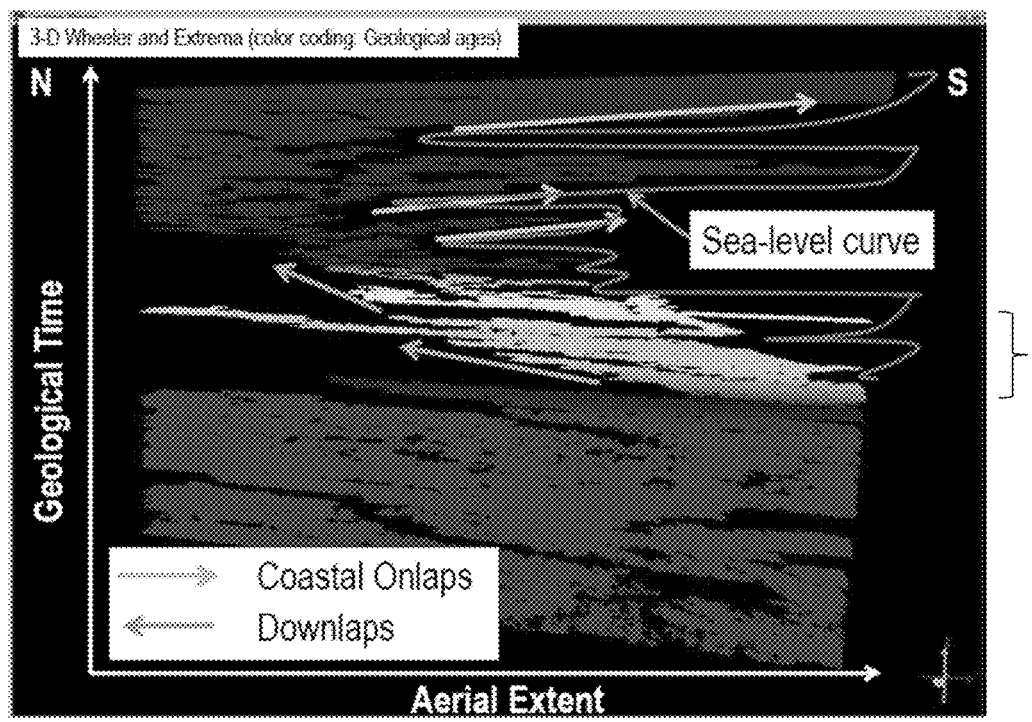
FIG. 3 shows the surface primitives of FIG. 2 mapped on a chronostratigraphic chart and overlayed with relevant portions of the sea-level curve, downlaps and coastal onlaps being indicated by arrows.

FIG. 2 shows schematically sections though an extrema representation of seismic data for a geological volume, and at bottom right a global, published sea-level curve. The left hand section includes surface primitives formed by extracting extrema positions within the extrema representation. The extraction can be performed manually or automatically, e.g. according to the method of United States Patent Publication No. 2004/0260476. In the schematic illustration of FIG. 2, the surface primitives are sorted according to geological time, e.g. according to the method of United States Patent Publication No. 2008/014319. FIG. 3 shows the surface primitives of FIG. 2 mapped on a chronostratigraphic chart and overlayed with relevant portions of the sea-level curve. Downlaps and coastal onlaps are also indicated by arrows.

The sedimentary flow simulation can be applied to model a sedimentary volume within the geological volume, such as a sedimentary volume which produces the sedimentary layers forming the surface primitives of FIG. 2, the approximate range of geological time corresponding to these layers being indicated by the bracket in FIG. 3.

Figure 4:
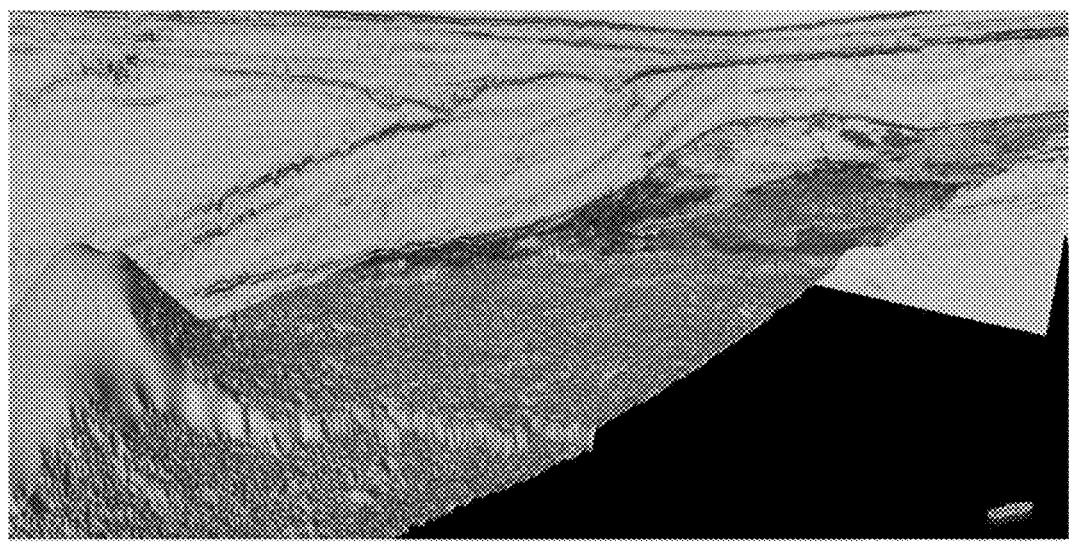
FIG. 4 shows a paleo sea floor for the sedimentary flow simulation superimposed on the seismic data of FIG. 2.
Figure 5:
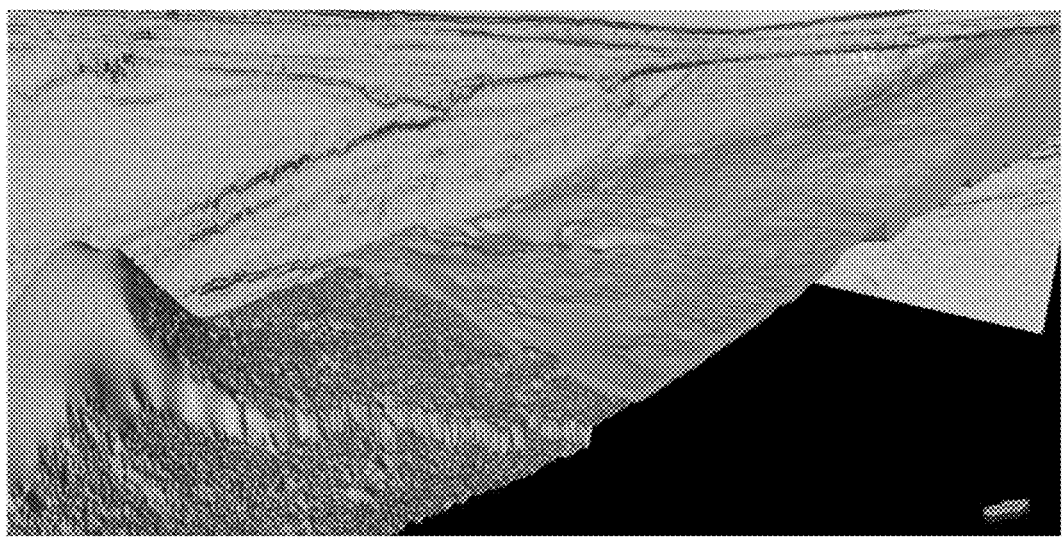
FIG. 5 shows, superimposed on the paleo sea floor of FIG. 4 and the seismic data of FIG. 2, a volume of sedimentary layers to be modelled.

The paleo sea floor for the simulation is shown in FIG. 4 superimposed on the seismic data of FIG. 2. FIG. 5 then shows, superimposed on the paleo sea floor and the seismic data of FIG. 2, the volume of the sedimentary layers to be modelled. As this volume is compacted, preliminary to performing the simulation the volume is de-compacted to provide the sedimentary volume which acts as a constraint on the simulation. De-compaction can be performed by the use of published de-compaction curves built for different types of sediments under different states of lithostratigraphic pressure. The curves show relationships between the properties of the sedimentary particles (e.g. grain size, chemical composition, etc.) and the amount of compaction according to the depth at which they are buried. Suitable de-compaction curves are also provided in commercially available geological modelling software such as, for example, Schlumberger's PetroMod™ software.

Figure 6:
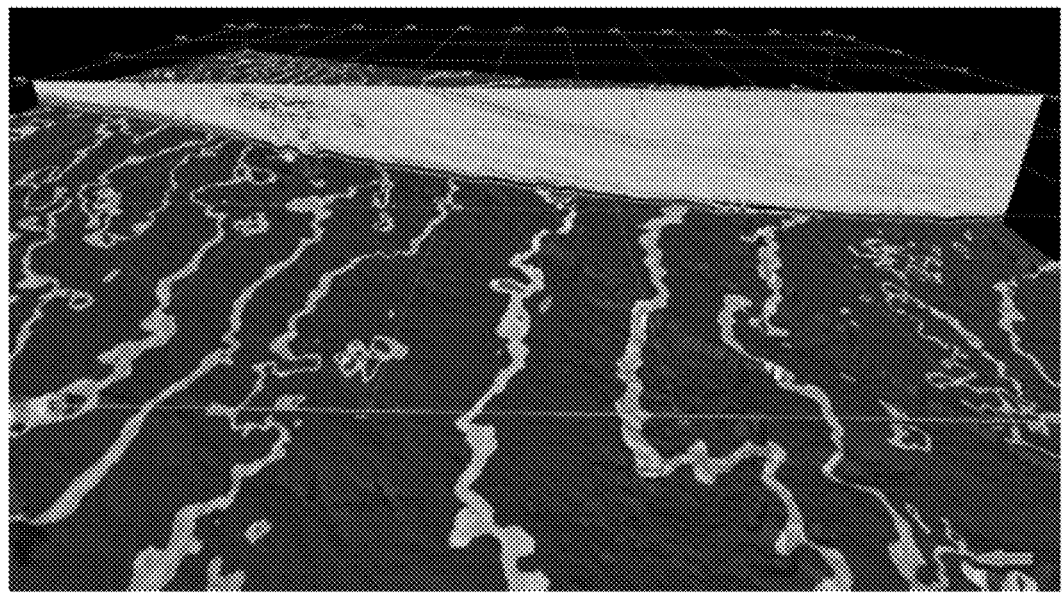
FIG. 6 shows a portion of the paleo sea floor of FIG. 4 superimposed with downlap terminations from succeeding surface primitives.

FIG. 6 shows a portion of the paleo sea floor superimposed with downlap terminations from succeeding surface primitives. The simulation can also be constrained to reproduce these terminations.

Figure 7:
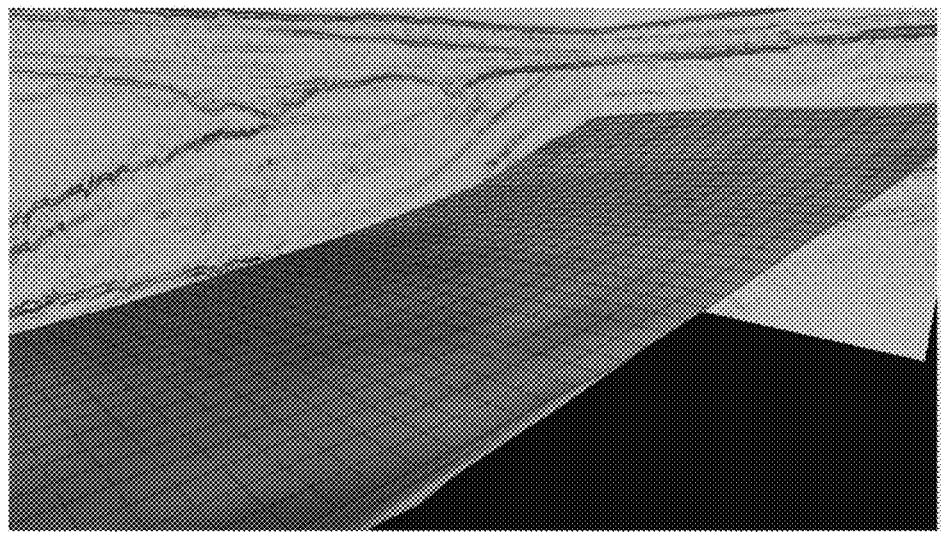
FIG. 7 shows a mid-run result from a run of the sedimentary flow simulation.

The simulation is then run, as described above, with different combinations of possible values for parameters defining e.g. particle size distribution in the flowing sediment, and variations in flow behavior for different sediment particle sizes (e.g. diffusion coefficients, diffusion functions which determine the amount of diffusion according to depth, transport coefficients which adjust the amount of sediments transported in a fluid and the distance transported). The values for each combination can be chosen, for example, by Monte Carlo sampling, in which the value for each parameter is randomly chosen from the respective range. FIG. 7 shows a mid-run result from an example simulation, and illustrates how different sized particles may be deposited at different positions on the sea floor. In FIG. 7 coarse sediments such as sand are indicated. The finer sediments are deposited the furthest distances form the sediment source.

Figure 8:
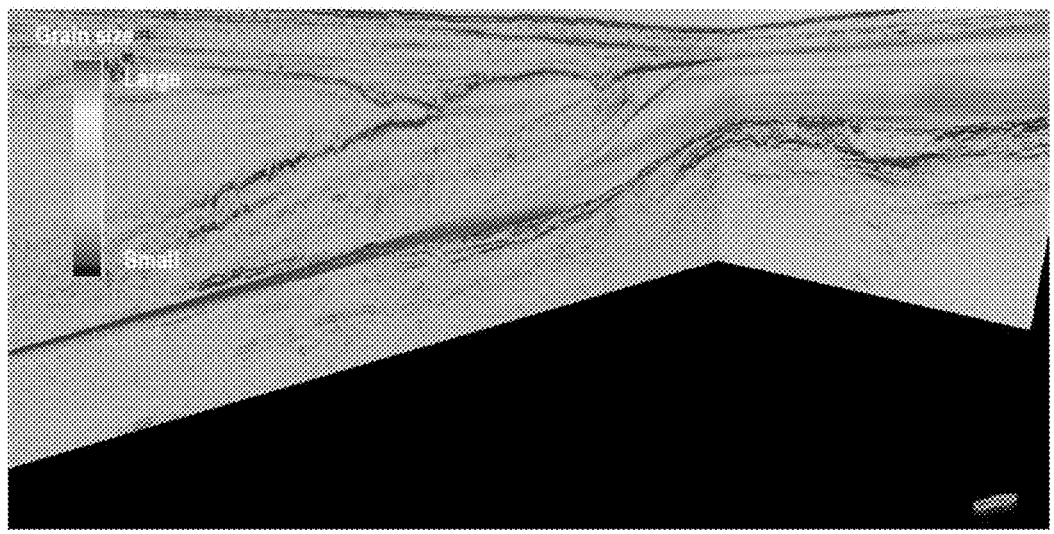
FIG. 8 shows a final prediction of one run of the sedimentary flow simulation.
Figure 9:
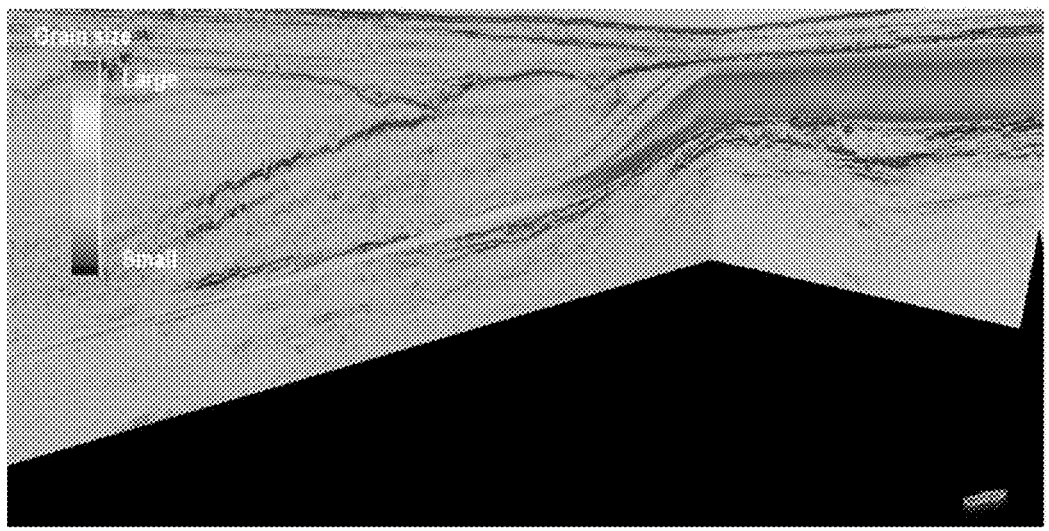
FIG. 9 shows a final prediction of another run of the sedimentary flow simulation based on a different particle size distribution for the sediment.

FIGS. 8 and 9 show final predictions of two example simulations after re-compaction and superposition on the seismic data of FIG. 2, each prediction having a different particle size distribution. The re-compaction can be performed by inverse use of the compaction curves previously used for de-compaction, for example. To match the simulation predictions to the seismic data, the vertical thickness of the relevant sedimentary layers in the seismic data may be compared to the vertical thickness of the re-compacted modelled sedimentary volume for a number of different positions in the area of interest. In particular, thickness variations relative to the distance from the sedimentary source(s) are sensitive to the ratio of fine to coarse sediments in the particle size distribution as coarser (heavier) particles are deposited close to their sedimentary source than finer (lighter) particles. Alternatively or additionally, the synthetic seismic data can include seismic reflector characteristics inferred from the different grain sizes in the sedimentary layers. As different grain sizes have different characteristics, these inferred characteristics can be compared with the measured characteristics from the seismic data.

Having optimized the variable parameters of the sedimentary flow simulation, the sedimentary flow simulation can be used to model the deposition of the sedimentary volume. This model, typically in combination with the seismic data, can in turn be used to inform or assist drilling or other operations, such as specifying well trajectories, for example.

In some embodiments, measurements made while drilling may be made during the drilling of a well. These measurements may include, among other things, measurement of the properties of the rock/formation being drilled, presence/properties of fluid(s), layer structure (layer thickness etc.) of the formation and/or the like. The measurements made while drilling may be fed into the sedimentary flow simulation to update the properties of the sediment/rock and/or used to update the synthetic seismic data. The updated data can be used to determine properties of sediment/rock that may be used to control the drilling procedure to optimize such procedure and/or to avoid drilling hazards. In this way, the drilling procedure can be controlled in real-time or near real-time based on iterative adjustment of the sedimentary flow simulation and/or the synthetic seismic data.

In some embodiments, a method for stratigraphic interpretation of seismic data is provided. In the method, seismic data is received from a seismic survey for a basin of interest. The basin of interest may comprise a location where a basin existed in a certain geological age. From the seismic data, a basin topography and bathymetry may be determined for at least one geological age.

The basin topography and bathymetry may be used to identify potential sources of sediments in the seismic data. In some embodiments, the seismic data may be converted into a geological time domain by chronosorting extrema surfaces in the seismic data according to relative and/or absolute geological age. Stratigraphic terminations of the geological surfaces may be identified in the geological time domain, and the identified stratigraphic termination patterns and the potential source of sedimentation may be used to process downlap, toplap, offlap or onlap surfaces. In embodiments of the present disclosure, the downlap, the toplap, the offlap or the onlap surfaces may then be displayed in the seismic data. In some embodiments, the identified downlap, toplap, offlap or onlap surfaces may be used to process the seismic data to determine volumes of associated sediments in the seismic data. These volumes may be used in the method described above to generate synthetic seismic data that may be compared to actual seismic data and/or updated actual seismic data using measurement while drilling. As described above the synthetic seismic data or the compared synthetic to actual seismic data may be used to control a drilling operation in the location of the basin.

Some embodiments of the present disclosure provide for stratigraphic interpretation of seismic data of a geological basin. A basin topography and bathymetry may be determined from the seismic data for at least one geological age. The basin topography and bathymetry may be used to identify potential sources of sediments in the seismic data.

The seismic data may be converted into a geological time domain by chronosorting extrema surfaces in the seismic data according to relative and/or absolute geological age. In some embodiments, surfaces corresponding to major stratigraphic discontinuities that delineate bounded sequences may be identified from the chronosorted extrema surfaces. The identified surfaces of the major stratigraphic discontinuities at specific geological times may be used to process sea level variations for the basin at different geological ages. These sea level variations may be used in either of the methods described above to determine source locations in the basin, interpret downlap, toplap, offlap or onlap surfaces and/or to process a sedimentation model.

Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment. Although the present disclosure has been described with respect to specific details, it is not intended that such details should be regarded as limitations on the scope of the invention, except to the extent that they are included in the accompanying claims.

The invention claimed is:

1. A method for determining sedimentary properties of a subterranean section of the Earth, the method comprising:
   providing seismic data for a geological volume, the seismic data comprising one or more sedimentary layers, wherein providing the seismic data includes:
      providing raw seismic test data for the geological volume; and
      extracting extrema positions within the raw data to generate the seismic data;
   de-compacting the sedimentary layers to obtain a sedimentary volume;
   providing a sedimentary flow simulation and using the sedimentary flow simulation in modeling deposition of the sedimentary volume, the simulation including a plurality of sedimentation process parameters;
   optimizing the process parameters to match the modelled sedimentary volume to the sedimentary layers of the seismic data; and
   using the optimized process parameters in the sedimentary flow simulation to obtain properties of the one or more sedimentary layers.

2. The method of claim 1, wherein the sedimentary flow simulation models sedimentation by different sediment particle sizes, and wherein the optimized process parameters include process parameters which specify (i) the distribution of particle sizes in the flowing sediment and (ii) variations in flow behavior for the different sediment particle sizes.

3. The method of claim 1, wherein the sedimentary flow simulation includes a constraint specifying a paleo sea floor for the deposition of the sedimentary volume.

4. The method of claim 1, wherein the sedimentary flow simulation includes a constraint specifying sea level variation with geological time.

5. The method of claim 1, wherein the sedimentary flow simulation includes a constraint which specifies one or more sources of sediment particles and fluid.

6. The method of claim 5, wherein optimizing the process parameters to match the modelled sedimentary volume to the sedimentary layers of the seismic data includes:
   matching the seismic data to each of a plurality of sedimentary flow simulations;
   ranking each of the plurality of flow simulations based on how well each flow simulation matches the seismic data;
   identifying a top number of the plurality of flow simulations based on how well the flow simulations match the seismic data; and
   adjusting ranges for the plurality of sedimentation process parameters for each of the top number of the plurality of flow simulations.

7. The method of claim 6, wherein the raw seismic data is generated by performing seismic testing on the geological volume.

8. The method of claim 1, wherein the sedimentary flow simulation models turbidity currents.

9. The method of claim 1, further comprising:
   using the sedimentary flow simulation to generate synthetic seismic data for the modelled sedimentary volume.

10. The method of claim 9, wherein optimizing the process parameters to match the modelled sedimentary volume to the sedimentary layers of the seismic data comprises comparing the seismic data with the synthetic seismic data.

11. The method of claim 1, further comprising:
    using the obtained properties of the one or more sedimentary layers to determine at least one of a location of a hydrocarbon and a location of a drilling hazard.

12. The method of claim 1, further comprising:
    using the obtained properties of the one or more sedimentary layers to determine a drilling trajectory for drilling a hydrocarbon well.

13. The method of claim 1, further comprising:
    using the obtained properties of the one or more sedimentary layers to control a drilling operation to drill a well.

14. The method of claim 13, further comprising:
    making measurements in the well during the drilling operation; and
    using the measurements to update at least one of the sedimentary flow simulation or the synthetic seismic data.

15. The method of claim 1, wherein the seismic data include surface primitives generated from the extracted extrema positions and sorted according to their geological time of deposition.

16. A method of analyzing a geological volume, the method comprising:
    providing seismic data for a geological volume, the seismic data comprising one or more sedimentary layers, wherein providing the seismic data includes:
       providing raw seismic test data for the geological volume; and
       extracting extrema positions within the raw data to generate the seismic data;
    de-compacting the sedimentary layers to obtain a sedimentary volume;
    providing a sedimentary flow simulation and using the sedimentary flow simulation in modeling deposition of the sedimentary volume, the simulation including a plurality of sedimentation process parameters;

optimizing the process parameters to match the modelled sedimentary volume to the sedimentary layers of the seismic data; and using the optimized process parameters in the sedimentary flow simulation to model the deposition of the one or more sedimentary layers in the geological volume.

17. A method of controlling a well drilling operation including:

performing the method of analyzing a geologic volume of claim 16;

using the analysis of the geological volume to specify a well trajectory which extends through the geological volume; and drilling a well having the specified trajectory.

18. A method for stratigraphic interpretation of seismic data, the method comprising:

determining a basin topography and bathymetry from the seismic data for at least one geological age;

using the basin topography and bathymetry to identify potential sources of sediments in the seismic data;

converting the seismic data into a geological time domain by chronosorting extrema surfaces in the seismic data according to one or more of relative geological age and absolute geological age;

identifying stratigraphic terminations of the geological surfaces in the geological time domain;

using the identified stratigraphic termination patterns and the potential source of sedimentation to process one or more of a downlap, a toplap, an offlap, or an onlap surfaces; and displaying locations of the one or more of the downlap, the toplap, the offlap, or the onlap surfaces on the seismic data or using the one or more of the downlap, the toplap, the offlap or the onlap surfaces to determine volumes of sediment in the seismic data.

19. A method for stratigraphic interpretation of seismic data of a geological basin, comprising:

determining a basin topography and bathymetry from the seismic data for at least one geological age;

using the basin topography and bathymetry to identify potential sources of sediments in the seismic data;

converting the seismic data into a geological time domain by chronosorting extrema surfaces in the seismic data according to one or more of relative geological age and absolute geological age;

identifying surfaces being major stratigraphic discontinuities that delineate bounded sequences from the chronosorted extrema surfaces; and using the identified surfaces being major stratigraphic discontinuities at specific geological times to process sea level variations for the basin at different geological ages.

20. A method for stratigraphic interpretation of seismic data of a geological basin, comprising:

processing the seismic data to identify an extrema surface;

processing the seismic data to identify at least one onlap surface associated with the extrema surface;

processing the seismic data to identify at least one downlap surface associated with the extrema surface;

processing a sedimentary volume from the extrema surface, the at least one onlap surface, and the at least one downlap surface;

correcting the sedimentary volume for compaction and/or any tectonic activity, thus reconstructing a corrected topography and bathymetry of the basin at ageological time of deposition;

using a sedimentary flow simulation to process a sedimentary distribution in the sedimentary volume and along the corrected topography and bathymetry;

processing synthetic seismic data from the sedimentary distribution;

comparing the synthetic seismic data with the seismic data to obtain an output; and ranking the output against another output ls relative to the seismic data.

* * * * *